US008293203B2

(12) United States Patent
Lewis et al.

(10) Patent No.: US 8,293,203 B2
(45) Date of Patent: *Oct. 23, 2012

(54) PREPARATION OF NANOSIZED COPPER (I) COMPOUNDS

(75) Inventors: Kenrick M. Lewis, Rego Park, NY (US); Chi-Lin O'Young, Poughkeepsie, NY (US)

(73) Assignee: Momentive Performance Materials Inc., Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/714,712

(22) Filed: Mar. 1, 2010

(65) Prior Publication Data

US 2010/0150811 A1 Jun. 17, 2010

Related U.S. Application Data

(63) Continuation of application No. 10/413,754, filed on Apr. 16, 2003, now Pat. No. 7,700,796.

(60) Provisional application No. 60/375,957, filed on Apr. 25, 2002.

(51) Int. Cl.
*C01C 3/08* (2006.01)

(52) U.S. Cl. .................. 423/371; 423/493; 977/773

(58) Field of Classification Search ................ 423/365, 423/371, 493; 977/773
See application file for complete search history.

(56) References Cited

U.S. PATENT DOCUMENTS

| | | | |
|---|---|---|---|
| 3,197,493 A | 7/1965 | Allison | |
| 4,237,063 A | 12/1980 | Bell et al. | |
| 5,011,958 A | 4/1991 | Campbell et al. | |
| 5,428,104 A * | 6/1995 | Barker et al. | 524/795 |
| 5,559,057 A * | 9/1996 | Goldstein | 438/725 |
| 5,637,745 A | 6/1997 | Silverman et al. | |
| 5,770,172 A | 6/1998 | Linehan et al. | |
| 5,879,715 A * | 3/1999 | Higgins et al. | 424/489 |
| 5,882,779 A | 3/1999 | Lawandy | |
| 6,160,161 A * | 12/2000 | Trabelsi et al. | 560/161 |
| 6,482,517 B1 | 11/2002 | Anderson | |
| 6,670,500 B2 | 12/2003 | Kamitamari et al. | |
| 7,205,255 B2 | 4/2007 | Yamamoto | |
| 2003/0032829 A1 | 2/2003 | Lewis et al. | |

FOREIGN PATENT DOCUMENTS

SU 972343 11/1982

OTHER PUBLICATIONS

Fletcher et al., The Kinetics of Solubilisate Exchange between Water Droplets of a Water-in-oil Microemulsion, J. Chem. Soc., Faraday Trans. 1, 1987, 83, pp. 985-1006.
Ito. Optical Properties of semiconductor ultrafine particles of CuCl, Saramikkusu, vol. 27, No. 6, 1992, pp. 508-514.
Onushchenko et al., Size effects in phase transitions of semiconductor nanoparticles embedded in glass, Journal of Non-Crystalline Solid 196(1996), pp. 73-78.
Qi et al., Synthesis of copper nanoparticles in nonionic water-in-oil microemulsions, Journal of Colloid and Interface Science, 186 (1997), pp. 498-500.
Pileni, Structural studies of colloidal assemblies used as microreactors, Handbook of Surf. Colloid Chem., CRC Press, Chapter 12, (1997), pp. 495-532.
Natarajan et al., Ultrafine metal particle formation in reverse micellar systems, Langmuir, 12(1996), pp. 2670-2678.
Hatton et al., Population dynamics of small systems, Langmuir, 9(1993), pp. 1241-1253.
Bagwe et al., Effects of the intermicellar exchange rate and cations on the size of silver chloride nanoparticles formed in reverse micelles of aot. Langmuir, 13(1997), pp. 6432-6438.
Itoh et al., Fundamental and nonlinear optical properties of semiconductor mesoscopic particles, Chem. Abstr. 131 (1999), pp. 31-46.
Zou et al., Preparation and optical properties of Cu2O nanoparticles, Chinese Science Bulletin, vol. 39, No. 1, (Jan. 1994), pp. 14-18.
Lisiccki et al., Control of the shape and the size of copper metallie particles, J. Phys. Chem. 100(1996), pp. 4160-4166.
Pileni, Reverse micelles as microreactors, J. Phys. Chem., 97(1993), pp. 6961-6973.
Stathis, Preparation of copper (I) chloride, Chemistry and Industry, May 24, 1958, pp. 633.
Fowles, Chemistry notes: on the preparation of cuprous chloride, The School Science Review, 44(1963), pp. 692-697.
Keller et al., Inorganic syntheses, vol. II, 1946, pp. 1-4.
Kandori et al., Formation of ionic water/oil microemulsions and their application in the preparation of CaCO3 particles, Journal of Colloid and Interlace Science., vol. 122, No. 1, Mar. 1988, pp. 78-82.
Boakye et al., Microemulsion-mediated synthesis of nanosize molybdenum sulfide particles, Journal of Colloid and Interface Science, 163, (1994), pp. 120-129.
Takahiro K et al., Formation of CuCl and AgCl Nanoclusters by Sequential Implantation, Nuclear Instruments and Methods in Physics Research, Section B: 206 (2003), 639-643.
International Search Report, PCT/US03/011608, dated Aug. 12, 2003.
Notification of Transmittal of International Preliminary Examination Report and International Preliminary Examination Report, PCT/US03/011608, dated Aug. 3, 2004.

* cited by examiner

*Primary Examiner* — Ngoc-Yen Nguyen
(74) *Attorney, Agent, or Firm* — Dominick G. Vicari; Joseph S. Ostroff

(57) ABSTRACT

A method of making nanosized copper (I) compounds, in particular, copper (I) halides, pseudohalides, and cyanocuprate complexes, in reverse micelles or microemulsions is disclosed herein. The method of the invention comprises (a) dissolving a copper (II) compound in the polar phase of a first reverse micelle or microemulsion, (b) dissolving a copper (II) to copper (I) reducing agent or a pseudohalide salt in the polar phase of a second sample of the same reverse micelle or microemulsion, (c) mixing the two reverse micelle/microemulsions samples to form nanometer sized copper (I) compounds and (d) recovering said nanometer sized copper (I) compounds. The present invention is also directed to the resultant nanosized copper (I) compounds, such as copper (I) chloride, copper (I) cyanide, and potassium cyanocuprate complexes having an average particle size of about 0.1 to 600 nanometers.

11 Claims, No Drawings

PREPARATION OF NANOSIZED COPPER (I) COMPOUNDS

CROSS REFERENCE TO RELATED APPLICATIONS

This application is a continuation of U.S. application Ser. No. 10/413,754 filed Apr. 16, 2003, now U.S. Pat. No. 7,700,796, which claims the priority of U.S. Provisional Application No. 60/375,957, filed Apr. 25, 2002, entitled PREPARATION OF NANOSIZED COPPER (I) COMPOUNDS, both of said applications being incorporated by reference herein in their entireties.

BACKGROUND OF THE INVENTION

1. Field of the Invention

The present invention is directed to a method of making nanosized copper (I) compounds and the resultant nanosized copper (I) compounds. In particular, the present invention is directed to a method of making nanosized copper (I) chloride, copper (I) cyanide, and cyanocuprate complexes.

2. Description of Related Art

Nanometer sized particles have diameters in the range from about 1 nanometer ($10^{-9}$ meter) to about 100 nanometers ($10^{-7}$ meter). These materials are also described in the art as nanostructured, nanocrystalline, nanosized, nanoparticulate, nanoscale, ultrafine, or superfine. Their structures and high surface to volume ratio make them desirable in catalytic, electronic, magnetic, and coating (pigment) applications. Various physical and chemical methods have been disclosed in the art for their preparation.

Nanosized copper (I) chloride is desired for its nonlinear optical properties and its utility in optoelectronics. There is a need for nanosized CuCl to satisfy the many laser and other applications in this field. The known art (see T. Ito, *Seramikkusu*, 27:508-514 (1992); A. Onushchenko, et al., *J. Non-Crystalline Solids*, 196:73-78 (1996); T. Ito et al., in *Mesoscopic Materials and Clusters* (T. Arai, Editor), Springer, Berlin, (1999), pp, 31-46, discloses synthesis of nanosized CuCl embedded in glass, alkali halide, and polymer matrices. However, the synthetic methods used are not suited to catalytic applications or to the isolation and recovery of nanocrystalline CuCl.

Copper (I) cyanide, CuCN, is a copper source for yttrium-barium-copper oxide superconductors, copper plating baths, and as a catalyst for Grignard and other alkylation reactions. Solid cyanocuprates such as $M[Cu(CN)_2]$, $M[Cu_2(CN)_3]$, $M_2[Cu(CN)_3]$ and $M_3[Cu(CN)_4]$ where M is sodium, potassium, or other metal, are important in the recovery of copper from ores. They have infinite microporous frameworks, which have utility in molecular sieves and catalysis.

It is known in the art to dissolve a soluble copper (II) compound in the polar phase of a reverse micelle/microemulsion of defined polar phase to surfactant molar ratio. A reducing agent (for example, $NaBH_4$ or $N_2H_4$) is dissolved in the polar phase of another sample of the same reverse micelle/microemulsion. Mixing the two samples leads to reduction of Cu (II) and formation of nanosized copper (I) oxide and/or nanosized copper metal. $Cu_2O$ with 5-10 nanometer particles was prepared in this way by Zou, et al. (*Chinese Science Bulletin*, 39:14-18(1994)). Lisecki, et al. (*J. Physical Chemistry*, 100:4160-4166 (1996)) disclosed the control of copper particle size and dispersity by control of water/surfactant molar ratio. Nanoparticles 2-10 nanometers were obtained at molar ratios, 1-10. Qi, et al. (*J. Colloid and Interface Science*, 186:498-500 (1997)) also prepared 5-15 nanometer copper particles in reverse micelles. M. P. Pileni (*J. Physical Chemistry*, 97:6961-6973(1993)) has reviewed the subject. In general, use of sodium borohydride or hydrazine does not allow careful, selective reduction to a nanosized copper (I) product from the copper (II) precursor, but rather complete reduction to nanosized copper (0) metal.

U.S. Pat. No. 5,770,172 to Linehan et al. issued on Jun. 23, 1998, discloses a process for producing nanometer-sized metal compounds comprising forming a reverse micelle or reverse microemulsion system comprising a polar fluid in a non-polar or low-polarity fluid. Again, as in the references cited above, the types of reducing agents used, i.e., phosphates, hydrazines, sodium borohydride, do not allow selective reduction to the copper (I) product from the copper (II) precursor. The reduction proceeds to the elemental metal.

Although it is known that the reduction of $CuCl_2$ to CuCl can be effected by ascorbic acid (E. Stathis, *Chemistry & Industry (London)*, 1958, p 633), by sulfites and reducing sugars (G. Fowles, *The School Science Review*, 44(1963) pp 692-694), and by phosphorous acid (R. N. Keller, *Inorganic Syntheses*, Vol. II, 1946, pp 1-4), there are no known previous applications of these chemistries to the synthesis of nanosized CuCl.

U.S. patent application Ser. No. 09/974,503 filed Oct. 9, 2001 teaches the preparation of nanosized CuCl by reaction of nanosized $Cu_2O$ with HCl in hydrocarbon solvents, or in a gas-solid environment. Reduction of Cu(II) is not essential since the nanosized $Cu_2O$ can be formed by any physical or chemical method available.

Notwithstanding the state of the prior art, it would be desirable to provide a method of making nanosized copper (I) compounds wherein there is a controlled and selective reduction from the copper (II) precursor to the copper (I) product and the resultant nanosized copper (I) compounds.

SUMMARY OF THE INVENTION

The present invention provides a method and process for producing nanosized copper (I) compounds, particularly CuCl, CuCN, and cyanocuprate complexes, in the range from about 0.1-600 nanometers. The method and process for CuCl comprise:

(a) dissolving a copper (II) compound in the polar phase of a reverse micelle or microemulsion dispersed within a non-polar continuous phase in the presence of surfactants or emulsifiers, (b) dissolving a reducing agent in the polar phase of another sample of the same reverse micelle or microemulsion, (c) mixing the two reverse micelles/microemulsions to form nanometer sized CuCl, and (d) recovering said nanometer sized CuCl.

Nanosized CuCl made by the instant method and process is useful in catalytic and non-linear optical applications.

For nanosized CuCN, the method and process comprise:
(a) dissolving a copper (II) compound in the polar phase of a reverse micelle or microemulsion dispersed within a non-polar continuous phase in the presence of surfactants or emulsifiers, (b) dissolving a soluble cyanide in the polar phase of another sample of the same reverse micelle or microemulsion, (c) adding the cyanide-containing reverse micelle/microemulsion to the copper (II)-containing one so that the molar ratio of cyanide to copper in the mixture remains $\leq 2$, (d) optionally, heating the reaction mixture to decompose any $Cu(CN)_2$ and/or $Cu[Cu(CN)_2]_2$ to nanosized CuCN, and (e) recovering said nanosized CuCN.

In another aspect, the present invention is directed to the formation of nanosized cyanocuprate complexes of general formulae, $M[Cu(CN)_2]$, $M[Cu_2(CN)_3]$, $M_2[Cu(CN)_3]$, and $M_3[Cu(CN)_4]$, where M is Li, Na, K, or Cs. For these compounds, the method and process include:

(a) dissolving a copper (II) compound in the polar phase of a reverse micelle or microemulsion dispersed within a non-polar continuous phase in the presence of surfactants or emulsifiers, (b) dissolving a soluble cyanide in the polar phase of another sample of the same reverse micelle or microemulsion, (c) adding the copper (II)-containing reverse micelle/microemulsion to the cyanide-containing one so that there exists a molar excess of cyanide relative to copper in the mixture to form, initially, nanosized $Cu[Cu(CN)_2]_2$ and/or $Cu(CN)_2$, (d) reacting $Cu[Cu(CN)_2]_2$ and/or $Cu(CN)_2$ with excess cyanide, and, optionally, heating to form nanosized cyanocuprates, and (e) recovering said nanosized cyanocuprates.

More particularly, the present invention is directed to a method of preparing a nanosized copper (I) compound comprising the steps of:

providing a first microemulsion having a discontinuous polar phase comprising a copper (II) precursor;

providing a second microemulsion having a discontinuous polar phase comprising a copper (II) to copper (I) reducing agent or a corresponding salt of a pseudohalide;

combining the first and second microemulsions in a reaction mixture; and separating the nanosized copper (I) compound from the reaction mixture.

In another aspect, the present invention is directed to a method of preparing nanosized copper (I) chloride comprising the steps of providing a first microemulsion having a polar phase to surfactant molar ratio of less than about 30 comprising a low or non-polar continuous phase comprising a surfactant, and a discontinuous polar phase comprising a copper (II) chloride where the discontinuous polar phase comprises nanosized droplets of the copper (II) chloride;

providing a second microemulsion having a polar phase to surfactant molar ratio of less than about 30 comprising a low or non-polar continuous phase comprising a surfactant, and a discontinuous polar phase comprising a reducing agent where the discontinuous polar phase comprises nanosized droplets of the reducing agent;

combining the first and second microemulsions into a reaction mixture; and collecting the nanosized copper (I) chloride from the admixture.

In yet another aspect, the present invention is directed to a method of preparing nanosized copper (I) cyanide comprising the steps of:

providing a first microemulsion having a polar phase to surfactant molar ratio of less than about 30 comprising a low or non-polar continuous phase comprising a surfactant, and a discontinuous polar phase comprising a copper (II) precursor where the discontinuous polar phase comprises nanosized droplets of the copper (II) precursor;

providing a second microemulsion having a polar phase to surfactant molar ratio of less than about 30 comprising a low or non-polar continuous phase comprising a surfactant, and a discontinuous polar phase comprising a cyanide salt soluble in the polar phase where the discontinuous polar phase comprises nanosized droplets of the cyanide salt;

combining the first and second microemulsions to form $Cu(CN)_2$ and/or $Cu[Cu(CN)_2]_2$;

thermally decomposing the $Cu(CN)_2$ and/or $Cu[Cu(CN)_2]_2$ to copper (I) cyanide; and collecting the nanosized copper (I) cyanide having an average particle size of less than 100 nanometers.

In still another aspect, the present invention is directed to a method of preparing nanosized cyanocuprate complexes comprising the steps of:

providing a first microemulsion having a polar phase to surfactant molar ratio of less than about 30 comprising a low or non-polar continuous phase comprising a surfactant, and a discontinuous polar phase comprising a copper (II) precursor where the discontinuous polar phase comprises nanosized droplets of the copper (II) precursor;

providing a second microemulsion having a polar phase to surfactant molar ratio of less than about 30 comprising a low or non-polar continuous phase comprising a surfactant, and a discontinuous polar phase comprising a cyanide salt soluble in the polar phase where the discontinuous polar phase comprises nanosized droplets of the cyanide salt;

combining the first and second microemulsions into a reaction mixture where a $CN^-/Cu(I)$ molar ratio is greater than 1; and collecting the nanosized cyanocuprate complexes from the admixture.

In a further aspect, the present invention is directed to a method of preparing nanosized copper (I) chloride comprising the steps of:

providing a first microemulsion having a polar phase to surfactant molar ratio of about 4 to about 20 comprising a low or non-polar continuous phase comprising a surfactant and a co-surfactant, and a discontinuous polar phase comprising copper (II) chloride where the discontinuous polar phase comprises nanosized droplets of the copper (II) chloride;

providing a second microemulsion having a polar phase to surfactant molar ratio of about 4 to about 20 comprising a low or non-polar continuous phase comprising a surfactant and a co-surfactant, and a discontinuous polar phase comprising a reducing agent soluble in the polar phase selected from the group consisting of ascorbic acid, ascorbic acid esters, salts of sulfurous acids, salts of phosphorus acids, and reducing sugars, where the discontinuous polar phase comprises nanosized droplets of the reducing agent;

combining the first and second microemulsions to form copper (I) chloride; and collecting the nanosized copper (I) chloride.

DESCRIPTION OF THE PREFERRED EMBODIMENT(S)

The present invention is directed to a method of making nanosized copper (I) compounds, in particular, copper (I) halides, copper (I) pseudohalides, and pseudohalide cyanocuprate complexes, in reverse micelles or microemulsions. Reverse micelles and microemulsions are optically clear, single phase dispersions of two immiscible liquids stabilized by surfactants (emulsifiers). In the preparation of these dispersions, a discontinuous polar phase (for example, water) is dispersed within a non-polar (or low polar) continuous phase (for example, cyclohexane) in the presence of surfactants or emulsifiers. The discontinuous polar phase comprises nanosized droplets, whose dimensions vary with the polar phase to surfactant molar ratio. Systems in which this ratio is less than fifteen are usually referred to as reverse micelles while microemulsions typically have polar phase to surfactant molar ratios greater than fifteen. A microemulsion has also been depicted as a bi-continuous region comprising a two-phase spongy-like network in which the non-polar phase forms the cellular skeleton and the polar phase fills the voids. The terms, "microemulsion" and "reverse micelles" are used interchangeably herein. The present invention is also directed to the resultant nanosized copper (I) compounds, such as copper (I) chloride, copper (I) cyanide, and potassium tetracyanocuprate (I) having an average particle size of from about 0.1 to about 600 nanometers.

The method of the invention comprises (a) dissolving a copper (II) compound in the polar phase of a first reverse micelle or microemulsion, (b) dissolving a Cu(II) to Cu(I) reducing agent or a pseudohalide salt in the polar phase of a second sample of the same reverse micelle or microemulsion, (c) mixing the two reverse micelle/microemulsion samples to form nanometer sized Cu (I) compounds and (d) recovering said nanometer sized Cu (I) compounds.

Pseudohalides are anions, comprising more than two electronegative atoms, which resemble halide ions in their chemical behavior. Examples of such anions are cyanide ($CN^-$), isocyanide ($NC^-$), cyanate ($OCN^-$), isocyanate ($CNO^-$), thiocyanate ($SCN^-$), and selenocyanate ($SeCN^-$). Thus, sodium cyanide and potassium thiocyanate are examples of pseudohalide salts that can be dissolved in the polar phase of the second microemulsion. Copper (I) cyanide and copper (I) thiocyanate are examples of copper pseudohalide compounds that can be prepared as nanosized materials according to the teachings of the instant invention.

Copper (II) Precursors

The copper (II) precursors useful in the present invention are compounds, such as $CuCl_2$, $CuBr_2$, $CuSO_4$, $Cu(NO_3)_2$, $Cu(OOCR)_2$—where R is hydrogen, $C_nH_{2n-1}$, phenyl or substituted phenyl, and n is 1 to 8 inclusive—other copper (II) carboxylates, such as maleate, fumarate, citrate, and tartrate, copper (II) diketonates and copper (II) alkoxides, which are soluble in polar solvents and are reducible to a copper (I) compound. Most preferred are $CuCl_2$ and $CuSO_1$.

The copper (II) precursor can also be complex salts of the general formulae $MCuX_3$ and $MCuX_4$, wherein M is an alkali metal, such as Li, Na, K, or Cs and X is a halide, such as Cl or Br. These complex salts are known in the art to be formed by mixing solutions of the copper (II) halide and alkali metal halide in appropriate stoichiometric proportions. Analogous copper (I) complex salts are also known. They have the general formulae $MCuX_2$, $M_2CuX_3$, and $M_3CuX_4$, wherein M and X have the same meanings as defined above.

The copper (I) halide-alkali metal halide complexes can be formed by reduction of the corresponding copper (II) complexes with metallic copper. For example, $KCuCl_2$ can be obtained in the following way KCl (3.5-4.0 moles) and $CuCl_2$ (0.5-1.0 mole) are dissolved in one liter of water to form $KCuCl_3$ in excess KCl. Powdered copper metal (1.5-2.0 moles) is then added and the mixture is stirred and heated to 80-100° C. for 3-5 hours. The resulting solution contains $KCuCl_2$ and can be employed in forming the copper-bearing microemulsions of the present invention. Nanosized CuCN is produced when this emulsion is treated with a KCN-bearing microemulsion.

Reducing Agents & Pseudohalide Salts

The reducing agents of the instant invention are those capable of converting copper (II) to the copper (I) oxidation state. They must also be soluble in the polar phase of the reverse micelle/microemulsion. Suitable examples include ascorbic acid, its salts and esters, sulfur dioxide, sulfurous acid and sulfite salts, phosphorous acid and its salts, iodide salts, cyanide salts, dialkyl sulfides, and reducing sugars (aldoses and ketoses), such as glucose and fructose. Preferred reductants are ascorbic acid, sulfurous acid, sulfite salts, phosphorous acid, and phosphite salts.

Pseudohalide salts, such as those of the alkali metals which are soluble in polar solvents are suitable for use in the second reverse micelle/microemulsion sample. The pseudohalide salts are dissolved in the nanosized droplets. They react with copper (II) when the two microemulsions are mixed to form transient or unstable, nanosized copper (II) salts, which decompose to yield the desired nanosized copper (I) compounds. Suitable pseudohalide salts are NaCN, KCN, KSCN, and NaOCN. Cyanide salts are preferred.

If the molar concentration of the pseudohalide anion in the reverse micelle/microemulsion exceeds that of copper, nanosized pseudohalide cuprate complexes can form. In these complexes, copper is still in the +1 oxidation state, but it is part of an anionic species. Examples of these anions are $[Cu(CN)_2]^-$, $[Cu_2(CN)_3]^-$, $[Cu(CN)_3]^{2-}$ and $[Cu(CN)_4]^{3-}$. The anion that predominates depends on the CN/Cu(I) molar ratio in the reverse micelle/microemulsion. The CN/Cu(I) molar ratio is preferable greater than about 1, more preferably about 1.5 to about 5.0.

Emulsion Systems

The reverse micelle and microemulsion systems useful in the present invention comprise a surfactant, preferably with a co-surfactant, a low or non-polar phase, and a polar phase. The microemulsions, per se, are known compositions when water is the polar phase. In some cases, the effect of simple electrolytes on microemulsion stability has been studied, but these studies have not generally included copper (II) salts, or the pseudohalide salts and reducing agents relevant to the instant invention. Additionally, these compositions have not been disclosed previously for the preparation of nanosized copper (I) compounds. The table below summarizes the general composition of the microemulsion systems.

| Non-Polar Phase | Polar Phase | Surfactant | Co-Surfactant |
|---|---|---|---|
| Hydrocarbons | Water | Alcohol Ethoxylates | Alcohols |
| Hydrocarbons | Water | Alkylpolyglucosides | Glycerol monoethers |
| Hydrocarbons | Water | Alkylpolyglucosides | Alcohols |
| Cyclic Silicones | Water | Siloxane-Polyethers | None |

As shown in the table, hydrocarbons can be employed as the low or non-polar phase. Suitable examples are linear and branched alkanes, such as hexane, isooctane, decane, and hexadecane; cycloparaffins, such as cyclohexane; and mixtures formed by exhaustive hydrogenation of highly aromatic petroleum residues, alkylated benzenes, polyaromatic hydrocarbons, petroleum distillates, and mineral oil. Hexane, cyclohexane, decane, nonylbenzene, NALKYLENE® 500 and WITCO CARNATION® 70 are preferred. NALKYLENE 500 is a mixture of alkylated benzenes sold by Vista Chemical Company. WITCO CARNATION 70 is a mixture of cycloparaffins sold by Crompton Corporation.

Cyclic siloxanes of the general formula $(RR'SiO)_n$ where R and R' are independently alkyl, cycloalkyl, and aryl, such as, for example, methyl, ethyl, phenyl, phenethyl, and the like; and n is 3 to 20. Methyl is most preferred; and n is preferably 4 to 6.

The surfactants are molecules with distinct hydrophobic and hydrophilic regions. Depending on their chemical structures, the surfactants can be non-ionic, cationic, anionic, or zwitterionic. An example of a non-ionic surfactant may be alkylphenolalkoxylates, such as TRITON® X-100, available from The Dow Chemical Company, Midland, Mich. Examples of cationic surfactants include alkyl ammonium salts, such as hexadecyltrimethylammonium bromide. Anionic surfactants can include metal salts of organosulfonates and organosulfosuccinates, such as sodium dodecylsulfate (SDS) and sodium bis(2-ethylhexyl)sulfosuccinate (NaAOT), respectively. Examples of zwitterionic surfactants include 3-(dimethyldodecyl-ammonium)propane sulfonate and cetyltrimethylammonium p-toluene sulfonate.

The hydrophobic part of the surfactant can be of various lengths, e.g., 8 to 20 carbon atoms, contain multiple bonds, or consist of two or more hydrocarbon chains. It can also contain organosiloxane groups and/or organofluoro groups, and/or organofluorosiloxane groups. Preferred surfactants useful for forming the reverse micelles and microemulsions of the present invention include alcohol ethoxylates, alkylphenolethoxylates, silicone surfactants, and alkyl polyglycosides.

When the solubilization of water, or the polar phase, into the low or non-polar phase by a non-ionic surfactant, such as TRITON X-100, is poor, it can be enhanced by the addition of a co-surfactant, such as an alcohol having from 5 to 10 carbon atoms. Preferred co-surfactants are pentanol, hexanol, and octanol, individually or in combination. Preferably, the weight ratio of co-surfactant to surfactant is about 1:5 to 2:3.

Typically, the surfactant and co-surfactant, in a specific ratio, are mixed first to form a blend. The blend is then mixed with the low or non-polar phase to form a homogenous blend solution. A preferable blend content in the solution is about 5 to about 30 vol. %. The low or non-polar phase can be cyclohexane, hexane, hexadecane, isooctane, alkylated benzenes, polyaromatic hydrocarbons, linear and branched paraffins, naphthenes, petroleum distillates, mineral oil, and/or linear or cyclic siloxanes.

Suitable polar solvents are water, monohydric, dihydric, and trihydric alcohols and organic nitriles, which have dipole moments greater than one Debye and/or dielectric constants (also called relative permittivity) greater than 6 at 20-25° C. Water is the preferred polar solvent.

In the microemulsion, the size of the polar phase droplets (radius of the droplets "$R_w$" in nanometers) depends upon the polar phase to surfactant molar ratio "w". Thus, in sodium dioctylsulfosuccinate reverse micelles, the relationship between the radius of the droplets and the polar phase to surfactant molar ratio is depicted by the formulae:

$R_w = 0.15(w)$ (M. Pileni, *Handbook of Surface and Colloid Chemistry*, chapter 12, CRC Press, (1997)) and $R_w = 0.175(w) + 1.5$ (P. Fletcher, et al., *J. Chemical Society, Faraday Transactions, I*, vol. 83 (1987) 985-1006).

Preferably, the polar phase to surfactant molar ratio, w, is less than about 30, more preferably from about 4 to about 25, and most preferably from about 6 to about 12. In some cases, the smaller the radius of the polar phase droplets (that is, lower w), the smaller the resultant particles of nanosized materials prepared in the microemulsion. However, there are published data (Pileni, loc. cit.) showing the opposite trend, viz a decrease in the size of the nanomaterial with increasing values of w. Other publications (for example, U. Natrajan, et al., *Langmuir*, 12 (1996) 2670-2678: T. Hatton, et al., *Langmuir*, 9 (1993) 1241-1253; and R. Bagwe, et al., *Langmuir*, 13 (1997) 6432-6138) report that the final particle size depends on variables other than the water to surfactant molar ratio. These variables include the concentration of reactants, the initial distribution of the reactant between the polar and non-polar phases and the kinetics of solubilisate exchange between the water droplets. For nanosized calcium carbonate and molybdenum sulfide, it has been reported (see K. Kandori, et al., *J. Colloid Interface Sci.*, 122 (1988) 78-82: E. Boakye, et al., *J. Colloid Sci.* 163 (1994) 120-120) that particle sizes increase with w up to a particular value and then stay approximately constant or even decrease. Thus, there are no clear teachings in the art on the expected trends for the particle size values of nanosized copper (I) compounds as the water content of the microemulsion is varied.

Mixing and Reaction Conditions

Vigorous mechanical stirring or ultrasonication is recommended during the mixing of the reactant microemulsions. One microemulsion can be added to the other gradually, for example, from an addition funnel or a syringe pump, or rapidly all in one portion. The order and method of addition can influence the appearance of the reaction mixture and the size and size distribution of the resultant nanosized product. In the preparation of nanosized CuCl, slow addition of the reducing agent microemulsion to the copper (II)-containing microemulsion leads initially to clear, water-white reaction mixtures with no visible solid particles. The nanosized CuCl nuclei remain in the water droplets and do not grow into larger visible crystals. When the reducing agent is added rapidly in one portion to the copper (II), cloudiness and/or precipitation of a white solid are observed immediately. This means that nucleation and growth of CuCl have occurred simultaneously and that larger particles can be expected compared to the gradual method of addition.

Similar considerations apply to formation of copper (I) pseudohalides and pseudohalide cuprates. However, in addition, formation of the pseudohalide cuprates depends on the order of addition of the microemulsions. It is necessary that the copper (II)-containing microemulsion be added to the pseudohalide-containing one to maintain a molar ratio of pseudohalide ions to copper ions greater than 1, preferably greater than 2, during mixing and at the end of the transfer, to obtain the nanosized pseudohalide cuprate complexes.

EXAMPLES

The following examples illustrate the preferred embodiments of the invention. They are not intended to limit the scope of the invention. Instead, they are presented to facilitate the practice of the invention by those of ordinary skill in the art

LIST OF ABBREVIATIONS USED

| ABBREVIATION | MEANING | ABBREVIATION | MEANING |
|---|---|---|---|
| g | gram | XRD | X-ray diffraction |
| nm | nanometer | HRSEM | High resolution scanning electron microscopy |
| μm | micron (micrometer) | TEM | Transmission electron microscopy |
| $D_4$ | $[CH_3)_2SiO]_4$ | FTIR | Fourier transform infrared spectroscopy |
| mL | milliliter | w | Water/surfactant molar ratio |
| d | interplanar spacing | $cm^{-1}$ | wavenumber |

Example 1

This Example illustrates the preparation of nanosized CuCl by reduction of $CuCl_2$ with ascorbic acid in the reverse micelle system comprising TRITON X-100/n-hexanol/cyclohexane/water.

A blend of 7.86 grams of TRITON X-100 (F.W. 624) and 1.97 grams of n-hexanol was first mixed having a weight ratio of co-surfactant to surfactant of about 1:4. The blend was mixed with cyclohexane to form a 100 mL blend/oil solution with 0.126 M TRITON X-100. An aqueous $CuCl_2$ solution (2.0 M) was prepared by dissolving 0.541 gram of $CuCl_2.2H_2O$ (F.W. 170.44) in 1.59 grams of water. The reverse micelles of aqueous $CuCl_2$ in cyclohexane were then obtained by adding the $CuCl_2$ solution to the blend/oil solution. The water to surfactant molar ratio, w, was 7.51.

The reverse micelles of aqueous ascorbic acid in cyclohexane were prepared in the same manner by adding a solution of 0.418 gram of ascorbic acid (F.W. 176.12) in 1.59 grams of water (1.5 M) to 100 mL of the TRITON X-100/n-hexanol/cyclohexane blend/oil mixture to obtain a microemulsion with w=7.01. The water of hydration in $CuCl_2.2H_2O$ accounts for the small difference in water/surfactant molar ratios between the two microemulsions.

Reduction of copper(II) to copper(I) occurred when the reverse micelles of ascorbic acid were added all in one portion to the reverse micelles of $CuCl_2$, while the latter was stirred mechanically in a large beaker under nitrogen at room temperature. A white colloidal suspension was formed. It was centrifuged for recovery of the solid.

XRD showed the white product to be CuCl. The most intense reflections were at d=3.109, 2.697, 1.910, and 1.631 Ångstroms. Both nanosized and micronsized crystals were observed by HRSEM. The nanosized ones were 500-600 nm.

Example 2

This Example illustrates the synthesis of nanosized $K_3[Cu(CN)_4]$ in a silicone microemulsion.

The first microemulsion was prepared by adding, with mechanical stirring, an aqueous solution of $CuCl_2$ to a mixture of cyclic $D_4$ (65 g) and SILWET® L-7622 (30 g). The $CuCl_2$ solution was made by dissolving 1.704 g $CuCl_2.2H_2O$ in 5 g deionized water. The second microemulsion was prepared similarly with cyclic $D_4$ (65 g), SILWET L-7622 (30 g), KCN (1.3 g) and deionized water (5 g). Based on the equivalent weight per polyether pendant of the SILWET L-7622 surfactant, the water to surfactant molar ratio, w, was 11.46.

The Cu(II)-silicone microemulsion was added all at once to the vigorously stirred KCN-silicone microemulsion in a large beaker in a nitrogen atmosphere at room temperature. On mixing the two microemulsions, a dark brown solid was initially formed. When the reaction mixture was warmed to about 60° C., it changed to a light green color. The solid was separated by centrifugation and recovered by decantation of the supernate. It was washed first with aqueous methanol to dissolve KCl and silicone surfactant, and later with dry methanol before drying at 100° C.

The XRD pattern of the solid was broad. It showed principal reflections at d spacings, 6.481, 5.891, 4.563, 4.152, 3.993, 3.846, and 3.592 Ångstroms, in good agreement with standard powder file data for $K_3[Cu(CN)_4]$. The average particle size was 240 nm. FTIR spectroscopy disclosed a strong CN band at 2108 $cm^{-1}$ and the presence of the silicone surfactant as a contaminant. Copper content was found to be 21.67 wt %. The calculated value for $K_3[Cu(CN)_4]$ is 22.30 wt %.

Example 3

This Example illustrates the preparation of nanosized $K_3[Cu(CN)_4]$ in reverse micelles/microemulsions with a water/surfactant molar ratio of 8.57

The quantities of raw materials used are set forth in the following table:

| Materials | First Microemulsion | Second Microemulsion |
|---|---|---|
| TRITON X-100, g | 8.0 | 8.0 |
| n-Hexanol, g | 2.0 | 2.0 |
| Cyclohexane, g | 70 | 70 |
| $CuCl_2 \cdot 2H_2O$, g | 1.108 | — |
| Water, g | 1.986 | 1.984 |
| KCN, g | — | 0.842 |

When the second microemulsion was added all at once to the first, a dark brown suspension of fine solids was produced. The color of the mixture became lighter during continued mixing at room temperature. On warming to about 50 to 60° C., the mixture turned progressively yellow-brown, yellow-green, and finally light green. Heating was discontinued at 80° C., the boiling point of cyclohexane.

Solid products were recovered by centrifugation and washed at least three times with aqueous methanol before they were dried in an oven at 100° C. FTIR spectroscopy showed a strong CN band at 2106 $cm^{-1}$ and the presence of the surfactant as a contaminant in the recovered solid. Copper content was 18.83 wt % instead of the 22.30 wt % required by the formula. The XRD pattern was coincident with that obtained for the product of Example 3. HRSEM disclosed a bimodal distribution of cubic crystals. The larger crystals were about one micrometer in size and the smaller ones were about 200 to about 600 nanometers.

Example 4

This Example illustrates the synthesis of nanosized CuCl in a silicone microemulsion.

The first microemulsion was prepared by adding, with mechanical stirring, an aqueous copper (II) chloride solution (1.729 g $CuCl_2$ in 5.02 g water) to a mixture of cyclic $D_4$ (62.16 g) and SILWET L-7622 (31.62 g). The second microemulsion was prepared similarly with cyclic $D_4$ (65.16 g), SILWET L-7622 (31.08 g), and an ascorbic acid solution made by dissolving 1.368 g of ascorbic acid in 5.07 g of deionized water. Based on the equivalent weight per polyether pendant of SILWET L-7622, the water to surfactant molar ratio was 11.07.

The silicone microemulsion containing ascorbic acid was added all at once to the vigorously stirred, $CuCl_2$-containing silicone microemulsion in a large beaker in a nitrogen atmosphere at room temperature. On mixing the two microemulsions, there was a visible increase in viscosity and the formation of finely divided white solid. The recovered solid had the same XRD pattern as a known sample of CuCl. HRSEM showed 25-30 nm round particles as well as 100-200 nm agglomerates of these particles.

Examples 5-8

These Examples illustrate the effect of rate of addition on the appearance of the microemulsion reaction mixture and on the particle size of the nanosized solid obtained therefrom The following tables set forth the compositions of the reactant pairs of microemulsions and their respective water to surfactant molar ratios. In Examples 5 and 6, the ascorbic acid microemulsion (second microemulsion in the tables) was added dropwise from an addition funnel into the mechanically stirred copper (II) chloride microemulsion (first microemulsion in the tables). Rapid, manual addition of the ascorbic acid microemulsion to the copper (II) chloride emulsion was used in Examples 7 and 8. All reactions were performed in round bottom flasks with provisions for a mechanical stirrer, addition funnel, and nitrogen sparge tube.

Composition of Microemulsions of Example 5 (w = 7-7.5)

| Materials | First Microemulsion | Second Microemulsion |
|---|---|---|
| TRITON X-100, g | 15.72 | 15.72 |
| n-Hexanol, g | 3.94 | 3.94 |
| Cyclohexane, g | 140 | 140 |
| $CuCl_2 \cdot 2H_2O$, g | 1.082 | — |
| Water, g | 3.18 | 3.18 |
| Ascorbic Acid, g | — | 0.866 |
| Water/Surfactant Ratio | 7.51 | 7.01 |

Composition of Microemulsions of Example 6 (w = 21-22.5)

| Materials | First Microemulsion | Second Microemulsion |
|---|---|---|
| TRITON X-100, g | 7.86 | 7.86 |
| n-Hexanol, g | 1.97 | 1.97 |
| Cyclohexane, g | 70 | 70 |
| $CuCl_2 \cdot 2H_2O$, g | 1.624 | — |
| Water, g | 4.77 | 4.77 |
| Ascorbic Acid, g | — | 1.299 |
| Water/Surfactant Ratio | 22.54 | 21.03 |

In the experiments, the blue color of Cu (II) was discharged gradually during the addition of the ascorbic acid microemulsion. The reaction mixtures were initially water white with no visible evidence of solid precipitation. They were stored in opaque bottles because previous experiments had shown that a yellow-brown coloration developed after 4-6 weeks on exposure to ambient light. After one month's storage at room temperature, suspended white solid was visible in the product of Example 5 and settled white solid in Example 6. The liquids remained water white TEM was performed by evaporating a drop of each reaction mixture directly on the FORMVAR®/carbon grid of the instrument A minimum of 200 particles was measured in each experiment. Average particle size of the CuCl in Example 5 (w=7-7.5) was 2.05±0.56 nm and in Example 6 (w=21-22.5) was 2.98±0.90 nm Composition of Microemulsions of Example 7 (w = 14-15)

| Materials | First Microemulsion | Second Microemulsion |
|---|---|---|
| TRITON X-100, g | 7.86 | 7.86 |
| n-Hexanol, g | 1.97 | 1.97 |
| Cyclohexane, g | 70 | 70 |
| $CuCl_2 \cdot 2H_2O$, g | 1.082 | — |
| Water, g | 3.18 | 3.18 |
| Ascorbic Acid, g | — | 0.966 |
| Water/Surfactant Ratio | 15.03 | 14.02 |

Composition of Microemulsions of Example 8 (w = 21-22.5)

| Materials | First Microemulsion | Second Microemulsion |
|---|---|---|
| TRITON X-100, g | 7.86 | 7.86 |
| n-Hexanol, g | 1.97 | 1.97 |
| Cyclohexane, g | 70 | 70 |
| $CuCl_2 \cdot 2H_2O$, g | 1.624 | — |
| Water, g | 4.77 | 4.77 |
| Ascorbic Acid, g | — | 1.299 |
| Water/Surfactant Ratio | 22.54 | 21.03 |

In the experiments of Examples 7 and 8, the ascorbic acid microemulsion was poured, through a funnel, into the Cu (II) microemulsion. The blue color was discharged and a water white reaction mixture, with no visible solid, was observed in each case. After one month's storage in opaque bottles, the product of Example 7 consisted of suspended white solid and water white liquid. In that of Example 8 the white solid had settled.

TEM was performed as described above. Particle size of the nanosized CuCl from Example 7 (w=14-15) was 6.67±4.65 nm and of Example 8 (w=21-22.5) was 5.66±1.70 nm. XRD of the solid from Example 8 confirmed that it was CuCl. Average particle size of the CuCl, determined from the XRD pattern by the Debye-Scherrer method, was 92 nm.

The present invention provides nanosized copper (I) compounds, and methods of making them, that are useful in catalytic, electronic, magnetic, and coating applications. The method the present invention provides a simple method of making the nanosized copper (I) compounds utilizing reverse micelles or microemulsions with selective reduction of the copper (II) precursor to the desirable copper (I) nanosized compound.

While the present invention has been particularly described, in conjunction with specific preferred embodiments, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present invention.

What is claimed is:

1. A method of preparing nanosized copper (I) cyanide comprising the steps of:
   providing a first microemulsion having a polar phase to surfactant molar ratio of less than about 30 comprising: a low or non-polar continuous phase comprising a surfactant, and a discontinuous polar phase comprising a copper (II) precursor wherein the discontinuous polar phase comprises nanosized droplets of the copper (II) precursor;
   providing a second microemulsion having a polar phase to surfactant molar ratio of less than about 30 comprising: a low or non-polar continuous phase comprising a surfactant, and a discontinuous polar phase comprising a cyanide salt soluble in the polar phase wherein the discontinuous polar phase comprises nanosized droplets of the cyanide salt;
   combining the first and second microemulsions to form copper (II) cyanide;
   thermally decomposing the copper (II) cyanide to copper (I) cyanide; and
   collecting the nanosized copper (I) cyanide having an average particle size of less than 100 nanometers.

2. The method of claim 1 wherein the non-polar phase comprises a compound selected from the group consisting of an alkane, an alkylated benzene and a cyclic siloxane.

3. The method of claim 1 wherein the non-polar phase comprises a cyclic siloxane having the general formula $(RR'SiO)_n$ wherein R and R' are independently selected from the group consisting of methyl, ethyl, phenyl and phenethyl, and n is 3 to 30.

4. The method of claim 1 wherein the non-polar phase comprises a cyclic siloxane having the formula $(RR'SiO)_n$ wherein R and R' are both methyl and n is 4.

5. The method of claim 1 wherein the surfactant is a non-ionic surfactant comprising an alkylphenolalkoxylate.

6. The method of claim 1 wherein the surfactant is a cationic surfactant comprising an alkyl ammonium salt.

7. The method of claim 6 wherein the cationic surfactant is hexadecyltrimethylammonium bromide.

8. The method of claim 1 wherein the surfactant is an anionic surfactant selected from the group consisting of sodium dodecylsulfate and sodium bis(2-ethylhexyl)sulfosuccinate.

9. The method of claim 1 wherein the surfactant is a zwitterionic surfactant selected from the group consisting of 3-(dimethyldodecyl-ammonium)propane sulfonate and cetyltrimethylammonium p-toluene sulfonate.

10. The method of claim 1 wherein the copper (II) precursor comprises $CuCl_2$ in an aqueous solution.

11. The method of claim 1 wherein the cyanide salt is KCN.

* * * * *